United States Patent [19]
Winders

[11] 3,738,611
[45] June 12, 1973

[54] FLOW CONTROL VALVE MEANS

[76] Inventor: Calvin M. Winders, 2704 Sells Street, Metairie, La. 70003

[22] Filed: Nov. 24, 1971

[21] Appl. No.: 201,766

[52] U.S. Cl. .............. 251/294, 251/123, 251/333, 137/454.2
[51] Int. Cl. ...................... F16k 51/00, F16k 47/00
[58] Field of Search .................. 251/123, 122, 294, 251/319, 333; 137/454.2, 454.6

[56] References Cited
UNITED STATES PATENTS

| | | | |
|---|---|---|---|
| 2,995,145 | 8/1961 | Heiser et al. | 137/454.2 |
| 2,223,854 | 12/1940 | Peaster | 251/294 X |
| 2,829,836 | 4/1958 | MacKenzie | 137/454.2 X |

Primary Examiner—Henry T. Klinksiek
Attorney—Pugh & Laiche

[57] ABSTRACT

The present invention pertains to flow control valves as employed in a standard piping system. More specifically, the present invention provides a flow control valve offering features which makes it inexpensive to manufacture and especially to maintain. The present flow control valve means basically comprises a main valve portion having a central opening to which a valve cover plate is operably attached and upon which cover plate all of the working parts, including the valve seat, plug, plug guides, plug or valve stem, and plug actuating means are operably mounted whereby the entire flow control assembly can be readily removed from the valve body in a very efficacious manner while employing conventional tools and without requiring any particuaar expertise. The present invention also provides a flow control valve of a design which minimizes the extent of wear realized in most present day control valves due to the influence of the normal dynamic forces encountered.

4 Claims, 3 Drawing Figures

Patented June 12, 1973

INVENTOR.
CALVIN M. WINDERS
BY
ATTORNEY

Patented June 12, 1973

INVENTOR.
CALVIN M. WINDERS
BY
ATTORNEYS

FLOW CONTROL VALVE MEANS

BACKGROUND OF THE INVENTION

The present invention relates to those arts concerned with fluid flow control devices as employed in piping systems for controlling fluid flow.

Present day flow control valves generally comprise a valve body having an internal flow pattern as realized in a conventional globe design of valve. In such an arrangement, the seat is horizontally positioned and the valve plug, which mates therewith, moves on a vertical reciprocating path relative thereto. The plug is connected to a valve stem which extends exteriorly of the valve body for connection generally to a valve diaphram assembly by which means the valve plug is actuated.

A distinct disadvantage of conventionally employed control valves today, especially of the globe valve design, are the problems related to the circumventuous path that fluid must take in order to pass through the valve. That is, the fluid must make two rapid 90° directional changes with the net result that considerable turbulence is created within the valve body. Such turbulence not only creates considerable pressure drop across the valve, but additionally results in excessive wear of the valve internals, specifically the valve seat and plug. One source of excessive wear experienced in a valve subjected to internal turbulence, is that known as chattering. This is caused by the valve stem rapidly vibrating within the valve body whereby excessive wear between the valve stem and related valve components is realized.

The above problem is overcomed by the present control valve which utilizes an in-line valve body design which essentially eliminates the turbulence normally encountered in a conventional control valve. By in-line is meant fluid flow along an essentially straight path, that is, the fluid is not forced to make rapid directional changes, but rather, remains essentially parallel to the longitudinal path of travel defined by the pipe conduit wherein the valve is positioned. Another distinguishing feature of the present invention is that what turbulence is realized in the present valve, if any, is greatly minimized as far as its effect on the valve stem and plug is concerned by providing fins on the valve stem whereby fluid flow through the valve stabilizes the valve stem and plug.

Another common problem of present day control valves is that in most designs, the seat is generally screwed within the valve body making it very difficult to remove, especially where the valve has been employed in corrosive mediums under rigid processing conditions. Moreover, many present day control valves are also of a design such that it is very difficult to gain access to the valve internals, especially without employing various special tools.

The latter problems associated with the present day control valves is also overcome by the present control valve in that the valve seat is mounted within the valve body in a tongue and groove relationship, the valve seat together with the valve stem and plug, as well as other moving components of the present valve being designed such that as an assembly they are bayonetted within the valve body. Pursuant to such design, the entire valve internal assembly can be readily removed by the use of conventional small hand tools in lieu of an special equipment.

The present invention therefore provides a very efficacious design of control valve which not only overcomes the limitations of prior art control valves, but additionally, provides a valve with certain novel design features which greatly minimizes wear between its internal moving components as will be further appreciated from the detailed description set forth hereinafter.

SUMMARY

The present control valve means basically comprises a valve body having its ends adapted for connection in a piping system. The valve body is provided with an opening in one side thereof which is adapted to receive a valve cover plate to which the valve seat, valve plug, and valve plug actuating means are operably connected. A valve cover plate means is provided on which valve seat means is affixed. The valve seat means is provided with an orifice through which fluid is allowed to flow. The valve seat means is also adapted to mate with the inside surface of the valve body means in a fluid tight relationship when the valve cover plate is operably affixed to the valve body. Valve plug means are provided which in turn are also connected to the valve cover plate means. The valve plug means is operably connected to plug actuating means which is provided for regulating the relative positions between the valve plug and the orifice in the valve seat whereby fluid flow through the valve can be regulated.

A preferred embodiment of the present invention is directed to valve plug means having a finned portion whereby the valve plug and stem are stabilized by virtue of fluid flow through the valve. In such manner, the affects of turbulence within the valve is greatly minimized, or even eliminated.

The valve plug actuating means preferably comprises a flexible cable assembly which, in conjunction with related components which are also operably mounted upon the valve cover plate means, provides essentially frictionless operation of the valve internals.

DESCRIPTION OF PREFERRED EMBODIMENT

Figures 1, 2:
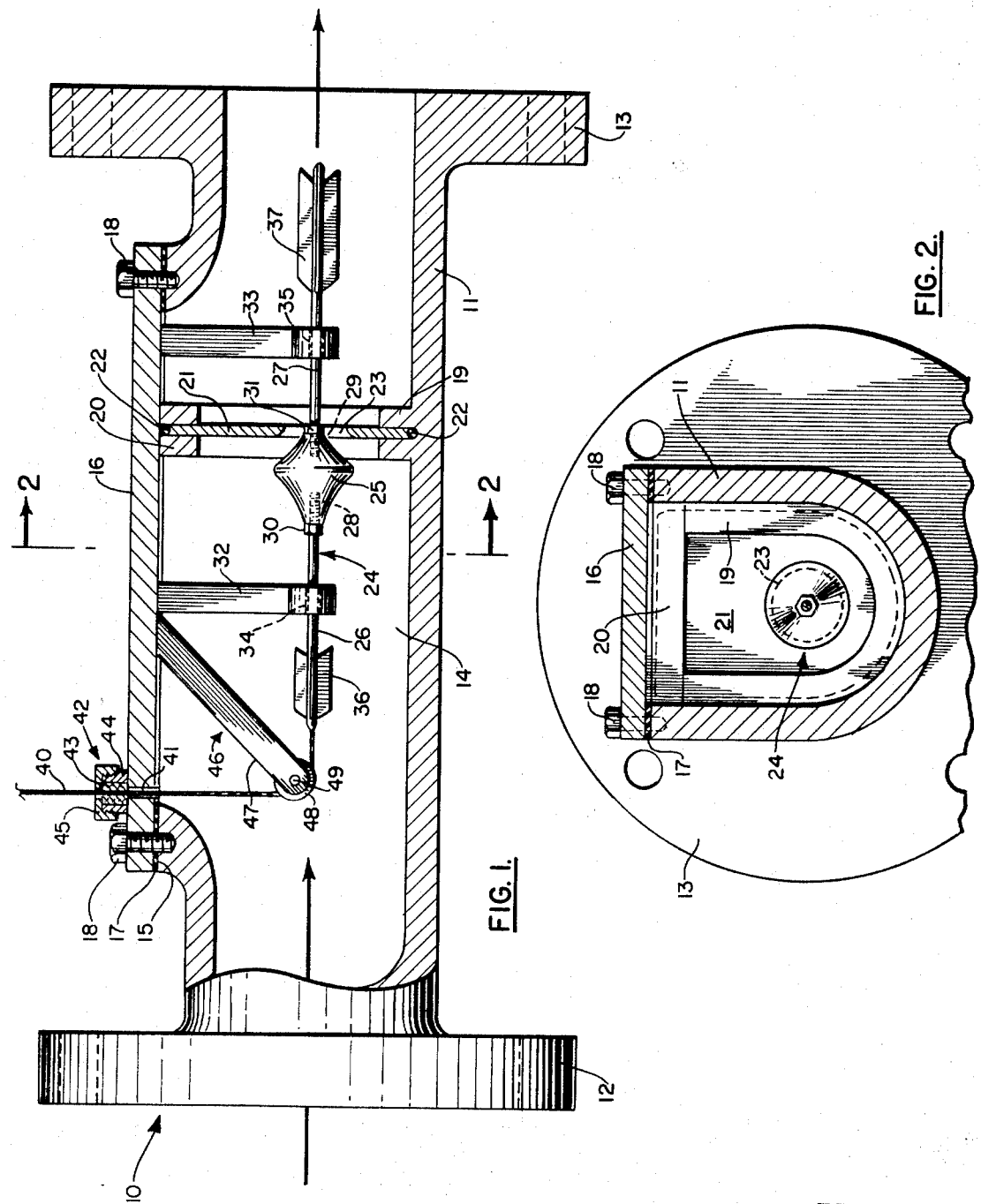
FIG. 1 in the drawing depicts a partial cross-sectional view of the present control valve means taken along the longitudinal axis of the present valve.
FIG. 2 represents a cross-sectional view taken along the line 2—2 of FIG. 1.

The control valve 10 as shown in the longitudinal cross sectional view depicted in FIG. 1 of the drawings, comprises the main valve body portion 11 which is preferably cylindrically shaped and which is adapted for connection in a standard piping system e.g. by virtue of the flanged portion 12 and 13 respectively. The valve body 11 is provided with the opening 14 which is preferably rectangularly shaped. The machined surface 15 is provided around the periphery of the opening 14 and is machined to mate in a fluid tight relationship with the valve cover plate means 16. The gasket sealing means 17 is preferably provided to effectuate a seal between the members and thereby insure positive sealing between the valve body 11 and the cover plate means 16. The mounting bolts 18 are provided for attaching the cover plate 16 to the valve body 11.

Figure 3:
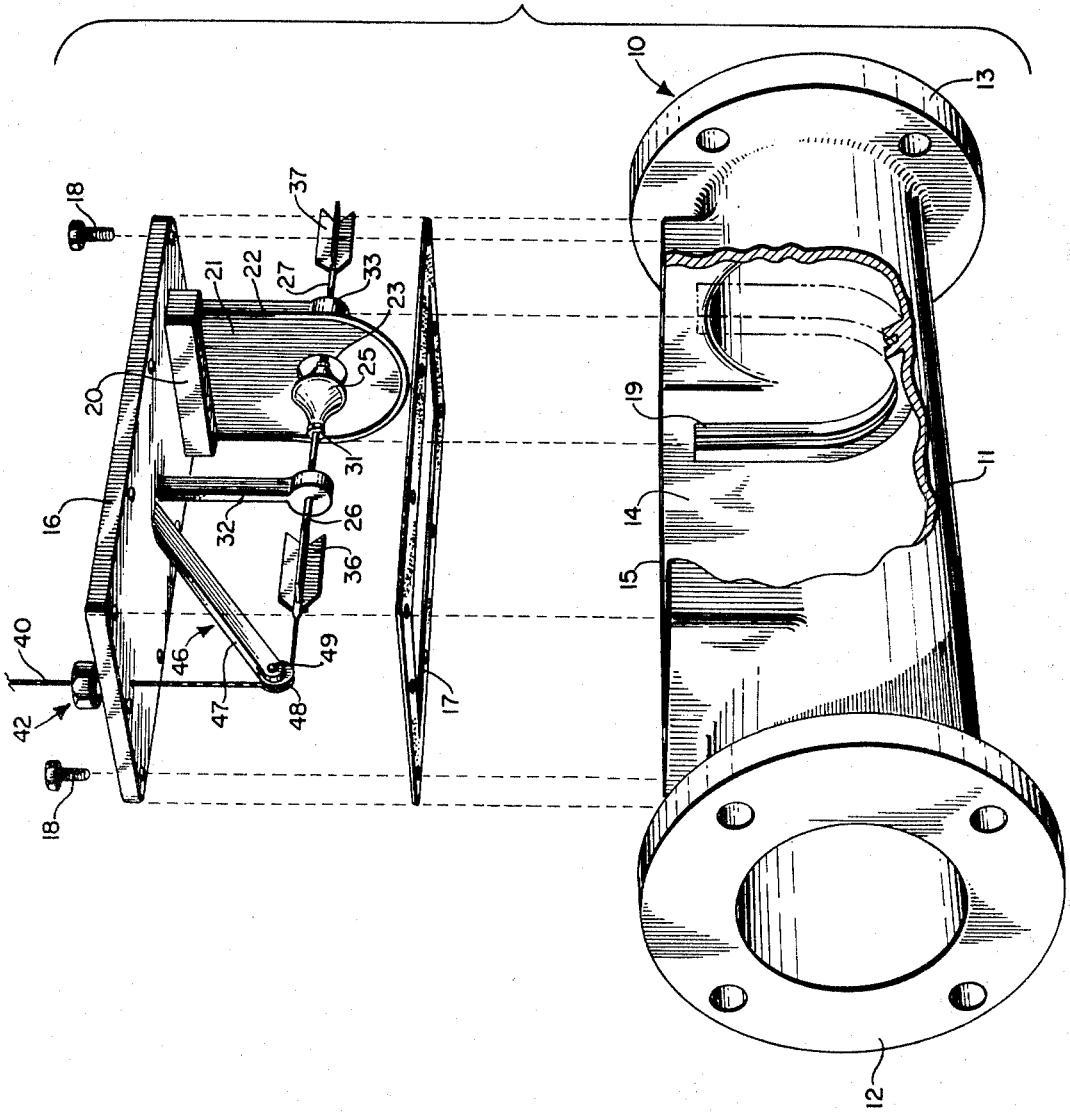
FIG. 3 represents an exploded isometric view showing the relationship between the internal valve assembly and the valve body which has been partially cut away to bear further details between the valve seat and its mating relationship with the valve body.

The valve body 11 is also provided with the grooved portion 19 which extends entirely around its inner peripheral surface and which is adapted to receive the valve seat means 21 as hereinafter defined. The grooved portion 19 can either be cast in the valve body 11 or welded in place. The grooved portion 19 is shown in further detail in FIG. 3 of the drawings as discussed below.

The valve cover plate means 16 is provided with the extended groove portion 20 which is also adapted to receive the valve seat means 21. The valve seat means 21 is preferably made to be separable from the valve cover plate means 16 whereby the valve seat and plug is readily replaceable to accommodate various different fluids as well as compensate for different process conditions thereby making the valve more versatile.

As brought out above, the valve seat means 21 is adapted to mate with and fit within the grooved portion 19 provided in the valve body 11. The valve seat 21 is preferably provided with the resilient sealing means 22, generally a rubber O-ring, which fits around the outer periphery of the valve seat 21 and contacts the inside surface within the grooved portion 19 thereby forming a fluid seal when the valve seat 21 is operably positioned within the valve body 11. This feature allows the rapid replacement of the valve seat unlike in ordinary flow control valves wherein the seat is usually screwed in place.

The valve seat 21 is provided with the orifice 23 through which fluid flow is controlled by virtue of the valve plug assembly means 24. The plug 24 is generally of a size and configuration sufficient to seal off and restrict fluid flow through the orifice 23 even though the plug could be made smaller than the orifice where only a throttling action is desired. The shape of the portion 25 of the valve plug assembly 24 as shown in FIG. 1 represents a standard hydrodynamic design which optimises the various hydraulic forces and criteria normally encountered in a closed piping application for conveying common fluids under standard processing conditions and flow rates.

The valve plug means 24 is provided with the extended shaft or stem portions 26 and 27 which are preferably connected to the main plug portion 25 by virtue of the threaded portions 28 and 29, respectively. In such manner, the plug assembly 24 can be readily disassembled and removed for repair or replacement. The jam nuts 30 and 31, respectively, are provided for preventing the extended stem portions from unscrewing during operation due to any turbulence that may be created within the valve by virtue of the flowing fluid. The plug guide means 32 and 33 are provided for holding and maintaining the valve plug assembly 24 in a fixed radial position so that the valve plug assembly is allowed to only move or reciprocate in a direction along its longitudinal axis. The tolerance defined between the extended stem portions 26 and 27 and the apertures 34 and 35, respectively, of the plug guide means, are sufficient so as to allow the extended stem portions to slide within said means. However, they are kept to a minimum to minimize vibration and its concomitant wear that may be caused by turbulence experienced within the valve during operation.

To minimize the possible effects of any turbulence generated within the valve during its operation, a preferred embodiment of the present invention incorporates the finned members 36 and 37 which are attached, respectively, to the extended stem portions 26 and 27. The fluid flowing through the valve contacts these finned members which extend radially outwards from the extended stem portions on which they are mounted. In such manner, fluid flowing over the surfaces of the finned members stabilize and dampen any vibration or chattering that may be created by turbulence occurring within the valve, e.g., due to the effects of fluid flow over and around the main plug portion 25 and through the orifice 23 in the valve seat 21.

The flexible cable 40 represents a preferred design by which the valve plug means assembly 24 is actuated. One end of the flexible cable 40 is connected to the extended shaft portion 26 of the valve plug 24 and its other end extends exteriorly of the valve body, specifically, it passes through the aperture 41 provided in the cover plate means 16 and the stuffing box assembly 42.

The stuffing box assembly 42 can be any suitably designed member incorporating some appropriate resilient sealing means 43 for preventing fluid flow or leakage along the flexible cable 40 and through the aperture 41 exteriorly of the valve 10. In the embodiment shown in FIG. 1, the stuffing box 42 comprises the packing retainer portion 44 which is permanently affixed to the cover plate 16. The packing 43 is positioned within the packing retainer 44 to which the packing gland 45 is threadably connected whereby pressure can be exerted upon the resilient packing 43 for maintaining a fluid tight seal between the flexible cable 40 and the valve cover 16.

The cable guide means 46 comprises the extended portion 47, one end of which is affixed to the valve cover plate 16 and its other end being provided with the pully means 48 which is rotatably mounted thereon by virtue of the shaft or pin 49. As further shown in FIG. 3 of the drawing, the flexible cable 40 passes over and around the pulley 48 which allows the cable to reciprocate with a minimum of friction.

By way of operation, fluid enters the valve 10 through conduit connected to the flange 12. The fluid flows in a straight path along the longitudinal axis of the present valve and upon contacting the plug portion 25 of the valve stem assembly 24, flows over and around the portion 25, through the orifice 23 defined in the valve seat 21 and then downstream. During such flow, the stabilizer fins 36 and 37 serve to stabilize the valve stem assembly 24 and minimize any possible effects created by turbulence if present within the valve. The quantity of fluid flow through the relative opening defined between the valve plug 24 and the valve seat 21 is varied by actuating the flexible cable means 40 such that the valve stem assembly 24 can be reciprocated along the longitudinal axis of the valve body 11. In such manner, fluid flow through the valve is controlled.

It can now be appreciated by one skilled in the art, that the internal components of the present valve can be readily removed in a very simple and expeditious manner utilizing conventional mechanics' tools such as box end or open end wrenches to fully maintain the present valve. As shown in the exploded view of FIG. 3, removal of the cover plate 16 allows eacy access to the valve seat 21.

It can be appreciated by one skilled in the art that various modifications in the design of the present valve can be made without departing from the true scope and spirit of the present invention. For example, the valve seat 21 can be made circular in which arrangement the cover plate valve seat grooved portion 20 would be U-shaped so as to extend over and encompass the top circular portion of the valve seat 21. Moreover, these members could be permanently attached to each other and in turn attached to the cover plate 16 so as to form a composite assembly. Additonally, the valve plug portion 25 can be positioned on a downstream side of the valve seat 21 whereby relaxation or failure of the flexible cable 40 will allow the valve to open rather than the fail close position illustrated in the drawings.

It can also be appreciated by one skilled in the art that the materials of construction of the present valve are not critical and would be selected commensurate with the particular service in mind. The valve body and cover plate can be readily formed from forged steel or cast from cast iron, or for that matter, can be readily fabricated from a plastic material. The valve stem assembly and valve seat are preferably made of a hardened material so as to resist relative wear between the moving components of the present valve.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. Flow control valve means comprising:
   a. valve body means having its ends adapted for connection in a piping system and being provided with an opening in one side thereof adapted to receive valve cover plate means to which valve seat means, valve plug means, and valve plug actuating means are operably connected when said flow control valve means is fully assembled;
   b. valve cover plate means adapted to mate and connect with the opening provided in said valve body means;
   c. valve seat means adapted to mate with said valve cover plate means and being provided with an orifice through which fluid is allowed to flow; said valve seat means being further defined in that it is also adapted to mate with the inside surface of said valve body means in an essentially fluid tight relationship when said valve cover plate means is operably affixed to said valve body means and said valve seat means being oriented in an in-line operable position;
   d. valve plug means operably connected to said valve cover plate means; and
   e. plug actuating means operably connected to said valve plug means and said valve cover plate means whereby fluid flows through the orifice in said valve seat means can be controlled upon regulating the relative position of said valve plug means to the orifice in said valve seat means.

2. The control valve means of claim 1 further characterized in that:
   said valve plug means is further defined as comprising an extended portion of a size and configuration sufficient to mate with and close off the orifice provided in said valve seat means and extended shaft portions extending upward along the longitudinal axis of movement of said valve plug means; said shaft portions being provided with finned members extending radially outwards, which finned members served to stabilze said valve plug means when fluid is flowing over and around its enlarged portion and through the orifice provided in said valve seat means when said valve plug means and valve seat means are not in a closed position.

3. The control valve means of claim 2 further characterized in that:
   said plug actuating means is further defined as comprising flexible cable means operably connected at one end to the upstream extended shaft portion of said valve plug means, and cable guide means operably mounted upon said valve cover plate means and positioned essentially along the longitudinal axis of travel of said valve plug means and over which the other end of said flexible cable means passes to a position exteriorly of said valve cover plate means, and said valve cover plate means is further defined as comprising cable sealing means through which said flexible cable passes so as to prevent fluid leakage from within said valve body means along said flexible cable means at that point where said flexible cable means extends exteriorly through said valve cover plate means.

4. The control valve means of claim 3 further characterized as comprising:
   f. valve plug guide means mounted upon said valve cover plate means and through which the extended shaft portions of said valve plug means extends so as to restrict the motion of said valve plug means along a longitudinal axis essentially perpendicular to the plane defined by the orifice in said valve seat means whereby said valve plug means is allowed to reciprocate relative to the orifice in said valve seat means upon the operation of said plug actuating means.

* * * * *